Sept. 22, 1936.  G. SMOLAK  2,054,869
VENEERED PANEL
Filed April 21, 1932
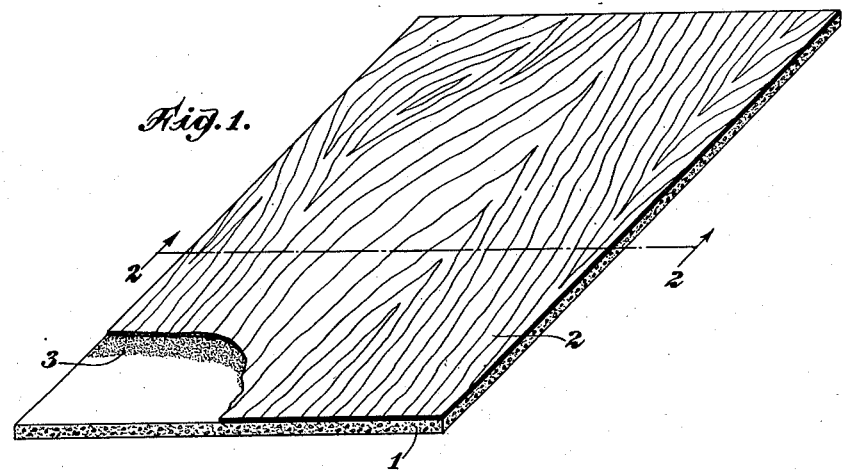
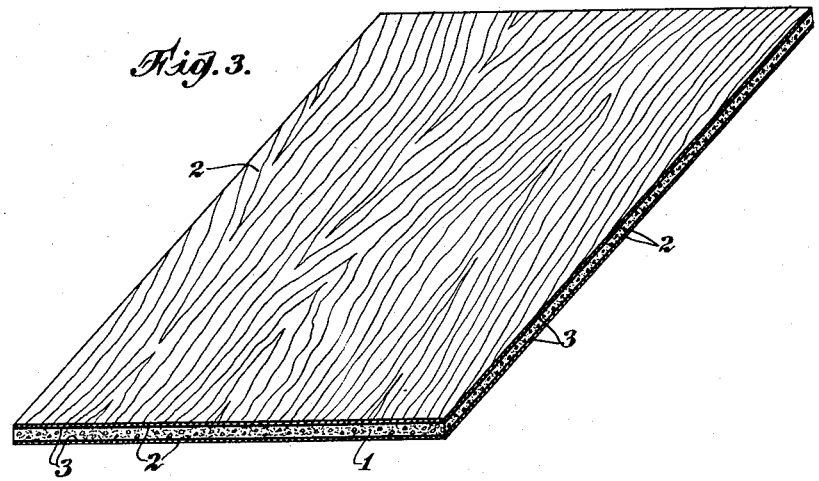
INVENTOR
George Smolak.
BY
ATTORNEY Patented Sept. 22, 1936

2,054,869

UNITED STATES PATENT OFFICE 2,054,869

VENEERED PANEL

George Smolak, Somerville, N. J.

Application April 21, 1932, Serial No. 606,575

4 Claims. (Cl. 154—45.9)

This invention relates to a structural material, and particularly to an improved stone-like panel provided with a wood veneer. A preferred embodiment of the invention is the structure comprising wood veneer adhered to a panel consisting of Portland cement and asbestos fiber, by means of a water and alkali resistant adhesive.

The use of plywood, that is wood to which is adhered a thin sheet of other wood, such as veneer, is in wide use. Also, the fact that asbestos and Portland cement board has points of superiority over wood for structural materials has been recognized. However, the use of such asbestos and Portland cement board as a base or support for a wood veneer has not been made heretofore, probably because of the difficulties that are inherent in the veneering of such board.

The setting of Portland cement is accompanied by the development of a substantial amount of alkali which affects adversely the adhesive used in the veneering, unless the adhesive is selected in accordance with the present invention. Another unfortunate effect of the alkalinity of the Portland cement compositions is the tendency of the lime therein to bleed through and discolor a wood veneer adhered thereto.

It is an object of this invention to overcome the difficulties that have been encountered heretofore in applying a wood veneer to asbestos and Portland cement board, and to produce a veneered stone-like unit of broad utility. Other objects and advantages will appear from the detailed description which follows.

The novel article of manufacture is illustrated in the accompanying figures in which Fig. 1 is a perspective view of a preferred embodiment of the invention, with parts broken away for clearness of illustration.

Fig. 2 is a sectional view of the article illustrated in Fig. 1.

Fig. 3 is a perspective view showing a modification of the invention in which the base material is veneered on both faces.

In the various figures, like reference characters denote like parts. Thus, 1 denotes the base material, suitably of stone-like character and preferably comprising asbestos fibers and Portland cement, 2 denotes the thin layer of veneer, such as walnut or mahogany wood, and 3 denotes the adhesive layer by means of which the veneer 2 is adhered to the base 1.

The process of veneering a stone-like unit of base material is illustrated by the following description of a method of making a wood-veneered asbestos and Portland cement board.

There is first produced the asbestos and Portland cement board, as, for example, by a conventional process. Thus, there may be made a wet mixture of Portland cement with asbestos fibers in approximately equal proportions by weight. This wet mixture is spread into a layer considerably thicker than the thickness desired in the final board, and is then submitted to very high pressure between two rigid, flat, metal plates, one of which provides means permitting the flow of water therethrough, whereby some water is squeezed out of the mixture and a board shape is produced. This shaped mass is then removed from the press and allowed to stand until the Portland cement constant sets. The result is a hard, rigid, dense, fireproof asbestos and Portland cement board that is much superior, as a base for a preformed veneered panel, to an ordinary cast Portland cement or concrete slab.

The asbestos and Portland cement board is suitably polished on one face at least, as by the use of a sanding belt. To this polished face there is then applied a coating composition comprising an adhesive substance, the application being made, for example, in one of the manners described below. Over this coating is then placed carefully the wood veneering which it is desired to adhere to the base material. The composite is then firmly compressed in conventional manner, as, for example, between rigid, plain, metal plates at a substantial pressure, say, at approximately 200 pounds per square inch. However, to avoid the danger of cracking the rigid base material and to ensure satisfactorily even distribution of pressure over the composited article, an improvement including a yieldable pressure distributing element of substantial thickness may be used. Thus a sheet of insulating lumber, one-half inch thick, consisting largely of felted wood fibers may be inserted between the layer of veneer and the platen of the press. The press is preferably hydraulic. If the adhesive used is thermoplastic, the pressing is made with heated plates at a temperature sufficiently high and for a sufficient time to make the adhesive plastic. Usually a temperature of 250° F. and a time period of 1 to 3 minutes is sufficient. After the pressing is completed, the product is cooled, preferably while still under pressure, and then removed from the press. If a readily volatile material such as water or an organic solvent has been used in the process, the product is then submitted to a drying operation. When no such water or solvent has been used, as when the thermoplastic adhesive has been used in dry form, the so-called drying operation may be omitted. In any case, no treatment subsequent to the pressing should be made at such a temperature as to loosen the veneer from the base. The resulting product may be trimmed to the exact size desired and the outer face of the wood veneer may be smoothly sanded, in accordance with the usual practice.

The coating of adhesive is preferably applied initially to the base only but may be applied to faces of the base and veneer that are to be adhered together. Also, the adhesive may be applied in several coats. Thus, a composition comprising a water and alkali resistant, thermoplastic resin and a volatile solvent therefor may be brushed or sprayed onto a face of the cement and asbestos board, for example, and the solvent allowed to evaporate from the coating, before the veneer is placed thereon. If a plurality of coats of the resin is to be applied, the first coat may be somewhat less viscous or less concentrated in resin than the later coat or coats. The thinness of the first coat increases the penetration or "footing" of the film, in the case of certain adhesives.

In general, the adhesive may be applied in the form of solutions or dispersions, in the form of a dry powder, or as thin sheet material which may or may not be somewhat softened by the application of a solvent thereto before being inserted between the base and the veneer. Some of the various methods of application will be illustrated by the following discussion of the method of applying specific adhesive materials.

The coumarone used is preferably one of relatively high softening point, made, for example, from a selected fraction of solvent naphtha by polymerization with sulphuric acid, as described in "Synthetic Resins and Their Plastics", by Ellis, 1923, Chapter 4. A thin film of this resin is formed on the asbestos and Portland cement base in a conventional manner. Then the wood veneer is laid over this film and pressed at a temperature that is suitably above the softening point of the coumarone, say, at about 100° C. After the pressing, the product is finished, that is, subjected to an elevated temperature, under no pressure, to cause evaporation of the volatile solvent (if any was used in applying the film of resin), trimming of the product to size desired, and sanding of the outer face of the veneer.

In using a phenol-aldehyde condensation product, such as bakelite, a similar procedure may be followed. Thus, a film of bakelite may be formed by spraying the stone-like base material with a concentrated solution of the bakelite in a volatile solvent therefor. There may be used a phenol-aldehyde product that is incompletely resinified or polymerized, the temperature of pressing of the composited article being such as to increase the resinification (insolubility and infusibility) of the compound and cause it to provide a very strong union between the veneer and the base.

As adhesive material, there may be used also a resin comprising a vinyl derivative. Thus, there may be used a polymerized vinyl ester, such, for example, as polymerized vinyl acetate or chloracetate, such as a vinyl resin that is now available commercially. The type of vinyl derivative preferred is one that is not only water and alkali resistant, but also of a relatively high temperature of softening, as, for example, above 75° C. The selected vinyl derivative may be applied to the asbestos and Portland cement board by spraying or brushing thereon in the form of a concentrated solution of the vinyl compound in a volatile solvent, such as a ketone, an ester, and/or an aromatic hydrocarbon. To this there is then applied the wood veneer to form a composite in which the vinyl adhesive constitutes the intermediate layer. The composite is then pressed together, as at a pressure of 250 pounds per square inch, and at a temperature above the softening point of the vinyl compound, that is, at a temperature adapted to render the adhesive plastic. This temperature may vary somewhat with the type of vinyl resin used as the adhesive. For a typical resin of this type, the temperature of pressing may be approximately 100° C.

Among the natural gums that are water and alkali resistant and that may be used as the adhesive for some purposes is rubber. The rubber may be used in the form of a dispersion or as latex. The rubber composition is applied to the face of the asbestos and Portland cement board and the veneering is placed thereon. The composite is then pressed and finished in conventional manner, the finishing including drying at an elevated temperature to remove volatile material present in the composition. The latex used for this purpose may be a prevulcanized product of a type which is now available commercially and which, after removal of water by evaporation, leaves a film of vulcanized, durable rubber. Other usual rubber compound ingredients may be present, as, for example, a compound adapted to increase the length of life of the rubber, such, for example, as an anti-oxidant. Also, the rubber may be added in the form of a rubber solution in an organic solvent, such as a rubber cement. The rubber composition may contain material adapted to cause vulcanization of the rubber in the adhesive film deposited from the composition.

The adhesive used may be modified by the addition of another material thereto, as, for example, a non-volatile solvent or plasticizer, to increase the thermo-plasticity. In the preferred embodiment of the invention, the adhesive film in the finished product is yieldable and flexible.

If, on the other hand, the adhesive material is too soft at temperatures to which the veneered product may be subjected during use, the softening by heat may be decreased, as by mixing with the adhesive a large proportion of a solid absorbent, such as comminuted diatomaceous earth.

When assurance against warping or excessive penetration of moisture into the veneered article, made as described above, is desired, the whole may be provided with an exterior, protecting layer, such as an oil, varnish, or lacquer film. Or, the protecting layer may be applied simply to the back face and edges of the veneered article, in such manner as to seal all exposed surfaces of the Portland cement and asbestos board.

To make sure that both sides of the finished article will have the same properties with respect to the absorption of moisture, and also to provide a product veneered on both faces, there may be applied a layer of veneering to both sides of the asbestos and Portland cement board. In applying veneering to both faces, it is desirable to composite the base material with adhesive and veneering on both sides, and to press the veneering onto both sides of the article at the same time.

The thickness of the base and veneer may be varied within wide limits. I use to advantage asbestos and Portland cement boards $\frac{1}{16}$ to 2 inches, say ½ inch, thick with wood veneering of American walnut, oak, or crotch mahogany ⅛ to 1/80 inch thick.

It will be understood that many variations from the details that have been given may be made without departing from the scope of the invention. Thus, the methods and technique of the plywood industry may be used whenever they will serve the purpose of the present invention, to supplement details herein given.

The coatings of adhesive, if made in solution or dispersed form, may be allowed to dry, in part, before the faces which are to be adhered together are brought into contact.

The product of this invention has certain features of advantage over veneered products heretofore made. For example, the new product, in the preferred embodiment of the invention, combines a stone-like base material and a wood veneer adhered thereto, to give an article that is more fire-resistant, durable, dense, and, because of its density and inertia, is less easily set in vibration by incident sound waves, than ordinary veneered wood. Also the product is non-corrodible.

While the invention has been illustrated particularly as applied to the veneering of an asbestos and Portland cement base, other base materials may be used, as, for example, stone-like panels that are sufficiently porous on the surface to make possible the firm anchorage thereto of adhesive material of the type described herein. Such stone-like panels may contain a hydraulic cementitious material that after setting contains a substantial content of alkali, as, for example, a calcium aluminate cement or Portland cement that has been previously mentioned.

The panels of cementitious compositions suitably contain a fibrous material. The fibrous material is preferably fireproof and adapted to increase the strength, modulus of rupture, and resistance to cracking on bending, of the cast, pressed, and set panels of cementitious composition containing the fibers. Asbestos is the preferred fiber. However, hemp fiber, or some other filler such as wood pulp or sawdust, may be used, if the specific desirable effects of the asbestos fiber are not desired. Thus, the invention comprehends, for example, the veneering of a composition board comprising organic filler and Portland cement and widely used in the construction of drainboards for kitchen sinks, and known as "Woodstone".

Since the details that have been given are for the purpose of illustration, not restriction of the invention, it is intended that the invention should be limited only by the terms of the claims.

What I claim is:

1. An article of manufacture comprising a preformed stone-like panel including Portland cement, a yieldable water and alkali resistant thermoplastic adhesive, and a veneer adhered to the panel by means of the said adhesive.

2. An article of manufacture comprising a panel consisting chiefly of a cementitious material adapted to develop a substantial content of alkali and a fibrous material, an alkali resistant adhesive, and a veneer adhered to the panel by means of the adhesive.

3. An article of manufacture comprising a panel consisting chiefly of Portland cement and a fibrous material, an alkali resistant adhesive, and a thin layer of wood veneer adhered to the panel by means of the adhesive.

4. An article of manufacture comprising a rigid, moisture-absorptive base material including substantial proportions of Portland cement and asbestos fibers distributed therethroughout, a thin sheet of the type of wood veneer, a film of alkali resistant adhesive adhering the sheet to a face of the base material and providing a seal against the penetration of moisture therethrough and a waterproofing material impregnated into the back portion of the base material, whereby unequal absorption of moisture and distortion under changing conditions of humidity are eliminated.

GEORGE SMOLAK.